(12) United States Patent
Yamasaki et al.

(10) Patent No.: US 7,207,680 B2
(45) Date of Patent: Apr. 24, 2007

(54) PROJECTION DISPLAY

(75) Inventors: Futoshi Yamasaki, Yokohama (JP);
Hiroshi Oshima, Fujisawa (JP);
Takuya Shimizu, Yokohama (JP);
Kazuo Shikita, Yokohama (JP); Satoshi Nakayama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 228 days.

(21) Appl. No.: 10/901,989

(22) Filed: Jul. 30, 2004

(65) Prior Publication Data
US 2005/0122483 A1    Jun. 9, 2005

(30) Foreign Application Priority Data
Jul. 31, 2003    (JP)    ............................. 2003-204210

(51) Int. Cl.
*G03B 3/02* (2006.01)
*G03B 21/53* (2006.01)

(52) U.S. Cl. .................... 353/101; 353/119; 349/57

(58) Field of Classification Search ................ 353/69,
353/70, 28, 11, 121, 101, 119; 349/5, 7,
349/57, 58, 60; 348/745, 744, 785; *G03B 3/02,
G03B 21/53*
See application file for complete search history.

(56) References Cited

U.S. PATENT DOCUMENTS

| | | | | |
|---|---|---|---|---|
| 3,912,385 A | * | 10/1975 | Stokes et al. ................. 353/94 |
| 4,731,706 A | * | 3/1988 | Ricard ......................... 362/463 |
| 5,465,121 A | * | 11/1995 | Blalock et al. ............. 348/744 |
| 5,895,110 A | * | 4/1999 | Okada et al. ................. 353/31 |
| 6,592,228 B1 | * | 7/2003 | Kawashima et al. ........ 353/101 |
| 6,671,004 B1 | * | 12/2003 | Runtze et al. ............... 348/745 |

FOREIGN PATENT DOCUMENTS

| | | |
|---|---|---|
| JP | 10-171044 | 6/1998 |
| JP | 2001-215610 | 8/2001 |

* cited by examiner

*Primary Examiner*—W. B. Perkey
*Assistant Examiner*—Andrew Sever
(74) *Attorney, Agent, or Firm*—Antonelli, Terry, Stout & Kraus, LLP.

(57) ABSTRACT

If a projection display device includes a shifting mechanism for shifting a projection lens to adjust the direction in which the display projects an optical image, it is difficult to find suitable position where the display should be installed. Thus, the projection lens is fitted with a projection angle adjusting mechanism, which includes an adjusting dial having a scale representing the position of the lens relative to a display element. The projection display device is capable of automatically displaying on the projected optical image a scale image corresponding to the scale. The projection display also is capable of displaying on the projected optical image the position of the optical axis of the projection lens, which can be shifted by the adjusting mechanism.

19 Claims, 5 Drawing Sheets

(a)    (b)

PROJECTION DISPLAY

BACKGROUND OF THE INVENTION

The present invention relates to a projection display device, including liquid crystal panels, DMD elements or other display elements for forming optical images, and a single projecting means for projecting the formed images on an enlarged scale. In particular, the invention relates to a projection display device including a mechanism for shifting the projecting means to vary the range of video light projection on a screen.

A known liquid crystal projector operating as a projection display device includes liquid crystal panels as display elements, which panels can be irradiated with light from a light source so that the images on the panels can be projected on an enlarged scale. In recent years, transmission and reflection display elements have been increasingly reduced in size, and they have exhibited improved performance, such as improved resolution. This has lead to the development of projection displays for various uses, such as displaying video images and computer images. There is a demand that these projection displays be small in size, high in luminance, uniform in screen luminance, and capable of displaying high contrast images.

In general, the projection display device is disposed in front of a screen. In this regard, it is essential that the projection display device should not obstruct the screen when one views the screen. For example, each of Japanese Unexamined Patent Publications No. H10-171044 and No. 2001-215610 discloses an apparatus including display elements and a projection lens, which is part of a projecting optical system. The optical axis of the projection lens is displaced upward or in another direction in parallel by a suitable distance relative to the display elements. The images projected onto a screen by this projection display device are shifted in the direction of lens displacement and in proportion to the distance of lens displacement. This makes the projection display device less obstructive to the screen and consequently more convenient.

A commercialized product includes a projection lens, which is part of a projecting optical system, and a shifting mechanism for shifting the lens. In order to improve the degree of freedom of the positions of the projected images, the shifting mechanism makes it possible to set any distances by which the optical system can be shifted continuously.

SUMMARY OF THE INVENTION

A conventional projection display device includes display elements, a projection lens and a shifting mechanism, which can arbitrarily shift the projection lens relative to the display elements. The images projected by this projection display device are shifted in proportion to the distances by which the projection lens is shifted. When the projection display device is installed in front of a screen, the optical axis of the projection lens is positioned perpendicularly to the screen by means of the shifting mechanism so that no trapezoidal distortion may be caused. In the meantime, the range of the video light projection from the projection display device is positioned in a desired position on the screen. In order to fulfil the requirements for positioning of the optical axis and the projection range at the same time, a series of trial and error operations is necessary. In particular, if the shifting mechanism is designed to shift the projection lens not only vertically, but also laterally, it is very difficult to suitably position the projection display device relative to the screen in proportion to the vertical and lateral distances by which the lens is shifted.

In view of the foregoing problem, it is an object of the present invention to provide a convenient projection display device that is simple to install in a suitable position where it can project images to a desired position on a screen without obstructing the screen when it is installed, and without causing trapezoidal distortion.

A projection display device according to the present invention includes a lighting optical system, a display element and a projecting optical system. The display element modulates the intensity of the light flux received from the lighting optical system to form an optical image. The projecting optical system projects the formed image on an enlarged scale. The projecting optical system includes a projection angle adjusting mechanism with a scale representing the position of this system relative to the display element.

DETAILED DESCRIPTION OF PREFERRED EMBODIMENTS

Figure 1:
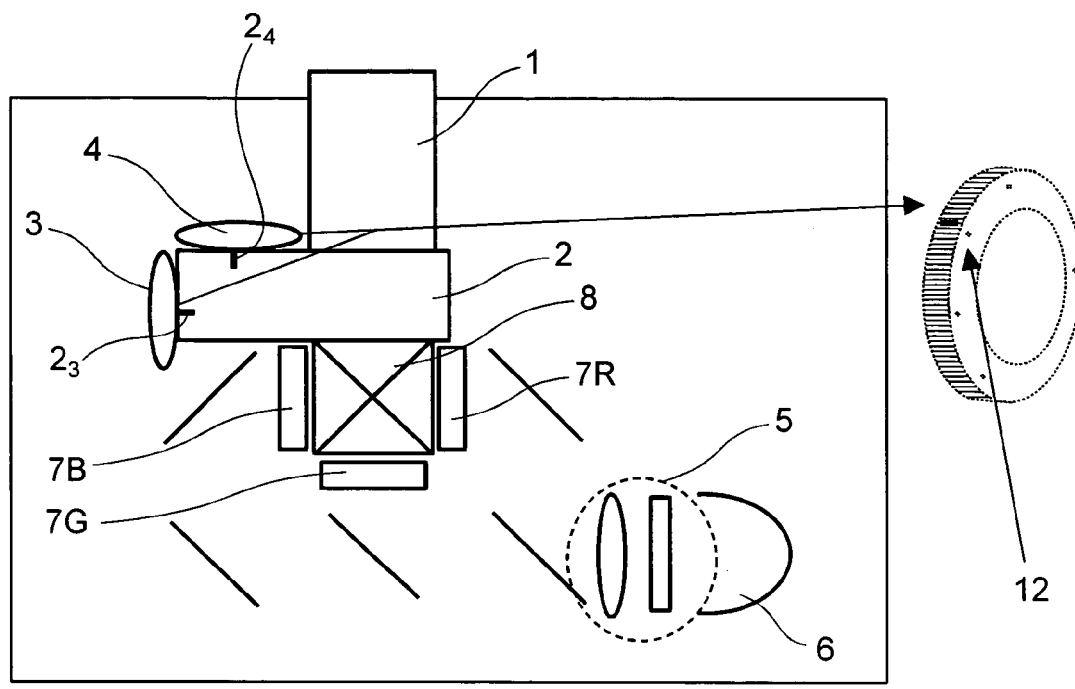
FIG. 1 is a diagrammatic top plan view of the optical unit of a projection display device according to an embodiment of the present invention.

Preferred embodiments of the present invention will be described below in detail with reference to the accompanying drawings, in which components having the same functions are identified by the same reference numerals. Once components are described, those having the same reference numerals will not be described again for the sake of simplicity.

A projection display device according to the present invention includes a projection lens fitted with a shifting mechanism, which is adjusted to a position where the display device is installed relative to a screen. The shifting mechanism shifts the projection lens to position the range of video light projection of the projection display relative to the screen. The shifting mechanism has scales corresponding to the distances by which the range of video light projection is shifted on the screen. The scales make it possible to roughly convert the necessary distances on the screen to the distances by which the shifting mechanism shifts the projection lens. This makes it easy to position the range of video light projection relative to the screen.

FIG. 1 is a diagrammatic top plan view of the optical unit of a projection display device embodying the present invention. The optical unit includes a projection lens 1 and a shifting mechanism 2, which shifts the lens 1 vertically and laterally so as to shift the range of video light projection of the projection display on a screen (not shown). The shifting mechanism 2 includes a vertical shift dial 3 and a lateral shift dial 4. The turning of the shift dials 3 and 4 adjusts the distances by which the projection lens 1 is shifted vertically and laterally. The shifting mechanism 2 has reference lines 23 and 24, which indicate the present positions of the shift dials 3 and 4, respectively, representing the position of the projection lens 1.

The optical unit also includes a lighting optical system 5, a lamp 6 operating as a light source, display elements 7R, 7G and 7B, and a synthesizing prism 8. The optical system 5 irradiates the display elements 7R, 7G and 7B with the light emitted from the lamp 6. Each display element 7R, 7G or 7B modulates the intensity of incident color light, forming an optical image in one of the three primary colors. The synthesizing prism 8 synthesizes the optical images formed by the display elements 7R, 7G and 7B. The synthesized images are projected on an enlarged scale through the projection lens 1 onto the screen.

Figure 3:
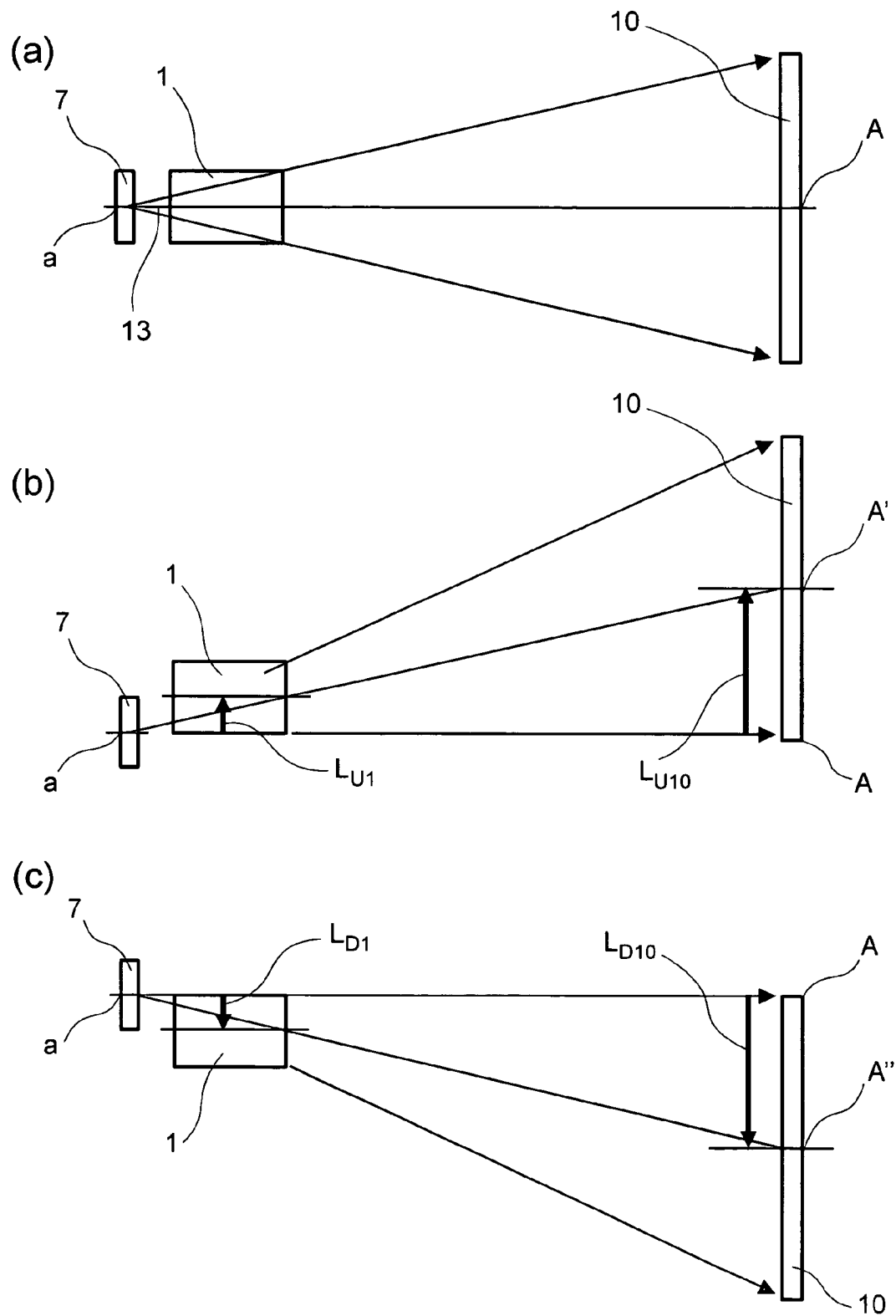
FIGS. 3a, 3b and 3c are diagrams which show the positional relationship between the projection lens and an image projected by the projection display device onto a screen.

As will be described later with reference to FIG. 3, the shifting mechanism 2 shifts the projection lens 1 relative to the display elements 7R, 7G and 7B so as to adjust the projecting position relative to the screen. As shown in FIG. 1, the shift dials 3 and 4 are inscribed with scales 12 so that it is possible to read the distances by which the projection lens 1 is shifted vertically and laterally. The scales 12 include thick marks indicating zero distances, which mean that the projection lens 1 is positioned in the center of a display element 7. In other words, the thick scale marks indicate that the direction in which an image is projected from the display element 7 through the projection lens 1 is perpendicular to the screen.

Figure 2:
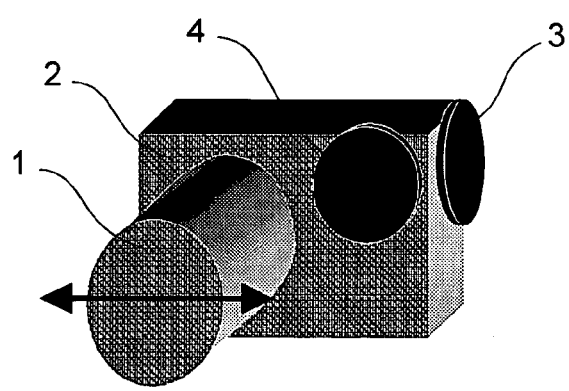
FIGS. 2a and 2b are perspective views of the projection display device, showing the relationship between the operation of the shift dials of the optical unit and the movement of the projection lens of this unit.
Figure 2:
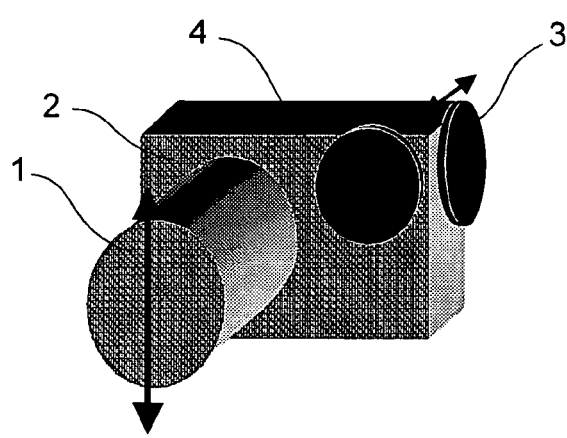

FIGS. 2a and 2b show the relationship between the turning of the shift dials 3 and 4 and the shifting of the projection lens 1. With reference to FIGS. 2a and 2b, a description is provided below indicating how the projection lens 1 is shifted when the shift dials 3 and 4 are operated. As shown in FIG. 2b, the turning of the vertical shift dial 3 vertically shifts the projection lens 1. As shown in FIG. 2a, the turning of the lateral shift dial shifts the projection lens 1. The dial scales 12 correspond to the distances by which the range of video light projection is shifted vertically and laterally on the screen.

Specifically, if the vertical shift dial 3 is turned by one scale mark, the projection lens 1 is shifted vertically by a distance equivalent to 1/10 of the vertical dimension of a display element. The vertical distance is equivalent to a vertical unit distance, which is 1/10 of the vertical dimension of the range of video light projection on the screen. Likewise, if the lateral shift dial 4 is turned by one scale mark, the projection lens 1 is shifted laterally by a distance equivalent to 1/10 of the lateral dimension of the display element. The lateral distance is equivalent to a lateral unit distance, which is 1/10 of the lateral dimension of the range of video light projection on the screen.

FIGS. 3a, 3b and 3c show how the direction in which an image is projected from a display element 7 changes with changes in the positional relationship between the display element and the projection lens 1. If the projection lens 1 is positioned just in front of the display element 7, as shown in FIG. 3a, the direction of image projection is aligned with the axis of the lens 1. In this case, point a on the optical axis 13 of the display element 7 corresponds to the vertically middle point A of the range of video light projection on a screen 10. If the projection lens 1 is shifted upward by a distance $L_{U1}$ relative to the display element 7, as shown in FIG. 3b, the direction of image projection is shifted upward by a distance $L_{U10}$. In this case, point a on the optical axis 13 of the display element 7 is projected at point A' on the screen 10 that is located upward by the distance $L_{U10}$ from middle point A. If the projection lens 1 is shifted downward by a distance $L_{D1}$ relative to the display element 7, as shown in FIG. 3c, the direction of image projection is shifted downward by a distance $L_{D10}$. In this case, point a on the optical axis 13 of the display element 7 is projected at point A'' on the screen 10 that is shifted downward by the distance $L_{D10}$ from middle point A. The distances $L_{10}$ by which the image projected onto the screen 10 is shifted upward and downward are proportional to the distances $L_1$ by which the projection lens 1 is shifted upward and downward, respectively. Because the distances by which the projection lens 1 is shifted correspond to the scale 12 of the vertical shift dial 3 of the shifting mechanism 2, the distances by which the projected image is shifted correspond to this scale 12.

The turning of the vertical shift dial 3 by one scale mark shifts the projected image vertically by the vertical unit distance, which is equivalent to 1/10 of the vertical dimension of this image. If one scale mark corresponds to less than 1/10 of the vertical dimension, the projected image can be shifted more finely. However, it is difficult to divide the vertical range of video light projection on the screen 10 into more than ten parts through visual measurement.

Likewise, the turning of the lateral shift dial 4 by one scale mark shifts the projected image laterally by the lateral unit distance, which is equivalent to 1/10 of the lateral dimension of this image.

Practical image projection involves first positioning the projection display so that the optical axis of the projection lens 1 is perpendicular to the screen 10 in order that no trapezoidal distortion may be caused. The vertical and lateral deviations of the center of the screen 10 from the optical axis of the projection lens 1 are converted by replacing the vertical and lateral unit distances with one scale mark of the vertical shift dial 3 and one scale mark of the lateral shift dial 4, respectively. The converted vertical and lateral deviations on the screen 10 are measured. By shifting the projection lens 1 by the converted deviations while looking at the scales 12 of the shifting mechanism, it is possible to project the correct shift quantities. For example, if the center of the screen 10 is deviated upward from and on the left side of the optical axis of the projection lens 1, the shift dials 3 and 4 are turned counterclockwise to shift the lens upward and to the left. Thus, the projection display can be installed easily in an adequate position where it can project an image to a desired position on the screen 10 without causing trapezoidal distortion.

The shift dials 3 and 4 may have numerals on them for their scales 12 so that the shift quantities can be read directly from the numerals. In this case, converted deviations can be added to or subtracted from the values of the scale marks of the shift dials 3 and 4 that are aligned presently with the respective reference lines $2_3$ and $2_4$ of the shifting mechanism 2. Then, the scale marks for the results of the addition or subtraction can be aligned with the reference lines $2_3$ and $2_4$.

The maximum angles for which the shift dials 3 and 4 can be turned may be 360 degrees. In this case, the scale marks of the shift dials 3 and 4 can correspond in one-to-one relation to the fractions of the distances by which the projected image is shifted. If the shift dials 3 and 4 were rotated two or more turns for adjustment, it would be difficult to know how their angles correspond to the distances by which the projected image is shifted. This difficulty is overcome by providing a one-to-one relation of the angles to the distances.

Each shift dial 3 or 4 may be fitted with a clicking mechanism, which makes it possible to know through the sense of touch that the shifting mechanism 2 is in the central position. Such a clicking mechanism is well known and will not be described here in detail.

Figure 4:
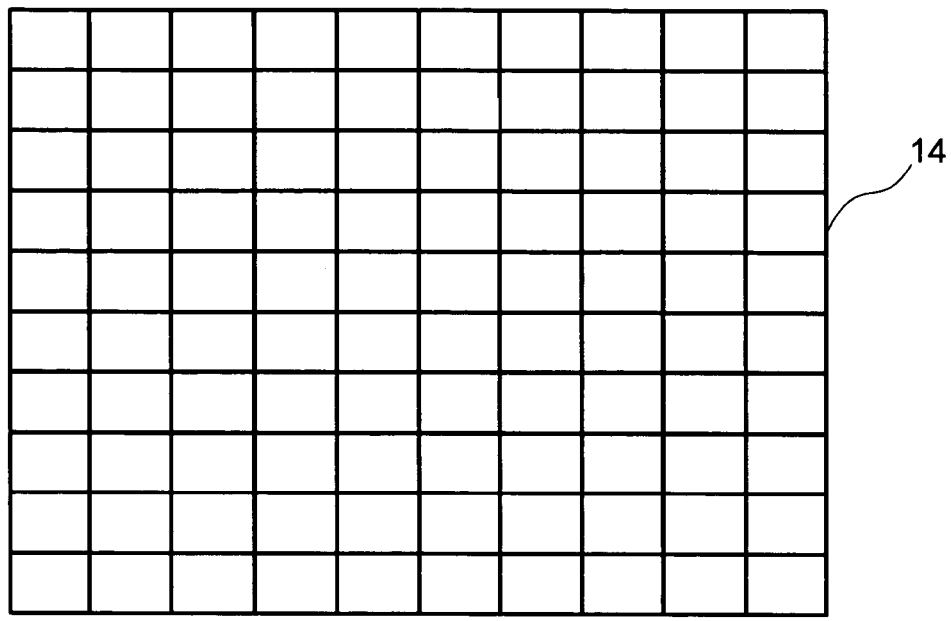
FIG. 4 is a diagram which shows a scale image displayed on the screen.

FIG. 4 shows a scale image 14 for use in effecting simpler measurement of the vertical and lateral deviations on the screen 10. The scale image 14 may be displayed on the screen 10 when the projection display is positioned relative to the screen. The scale image 14 is a lattice pattern dividing the screen 10 into 100 cells. The vertical and lateral dimensions of one of the cells correspond to the vertical and lateral unit distances, respectively, and they also correspond to one scale mark of the vertical shift dial 3 and one scale mark of the lateral shift dial 4, respectively. When the deviations of the center of the screen 10 from the optical axis of the projection lens 1 are measured, the comparison between the screen center and the projected scale image 14 makes it possible to determine how much the shift dials 3 and 4 need to be turned.

Figure 7:
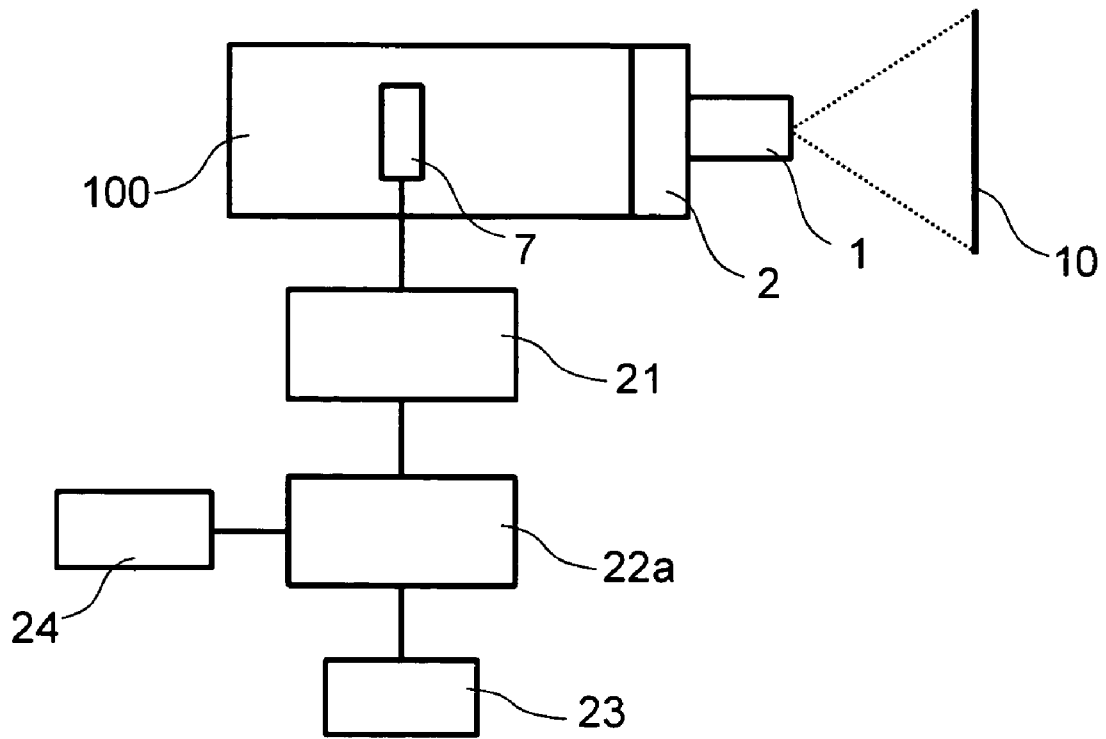
FIG. 7 is a block diagram of a projection display device according to still another embodiment of the present invention.

FIG. 7 is a block diagram of a projection display device that displays a scale image 14. This projection display device includes a display drive circuit 21, a microcomputer 22a operating as an arithmetic sequence unit, a scale display button 23 and a memory 24, in which the scale image 14 is stored. For example, if the display button 23 is pushed, the microcomputer 22a reads the scale image 14 from the memory 24 and sends the read image through the drive circuit 21 to the display elements 7 of the optical unit 100, which displays the scale image 14 on the screen 10. If the display button 23 is pushed again, the display of the scale image 14 is terminated.

The projection display may further include a shifting mechanism operation detector for automatically detecting that the shifting mechanism 2 has been operated. In this case, when the operation is detected, the scale image 14 can be displayed automatically. The automatic detection may involve detecting the turning of the shift dial 3 or 4. Thus, it is possible to display the scale image 14 automatically by merely starting the adjusting of the shifting mechanism 2.

Figure 8:
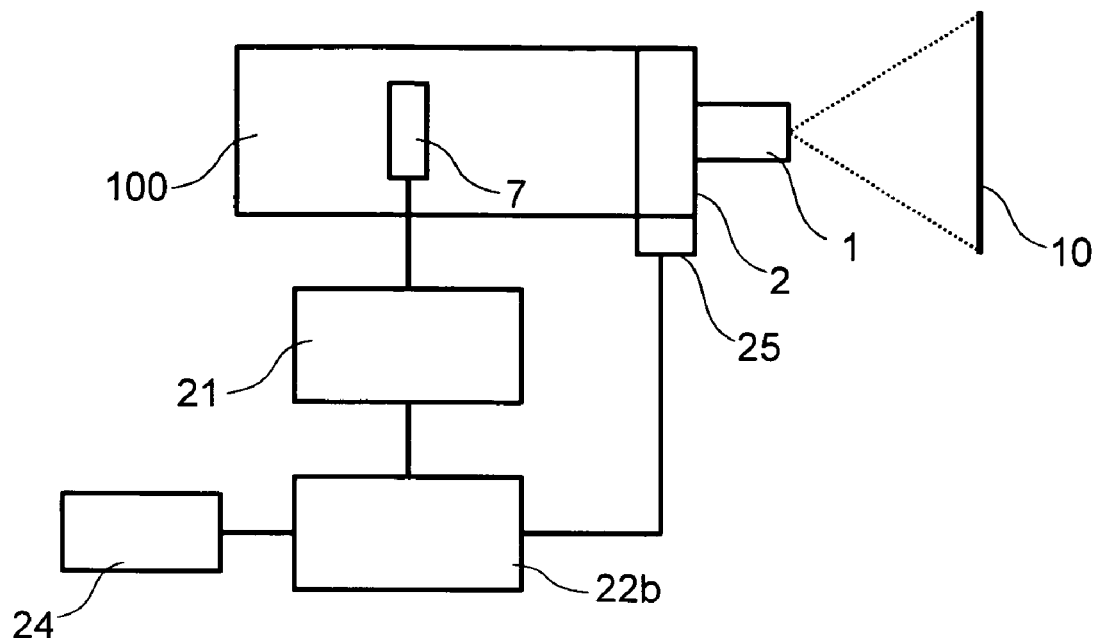
FIG. 8 is a block diagram of a projection display device according to yet another embodiment of the present invention.

FIG. 8 is a block diagram of a projection display device including a shifting mechanism operation detector. This projection display device includes a display drive circuit 21, a microcomputer 22b and a memory 24. The shifting mechanism 2 of this display device includes an encoder 25. For example, if the shift dial 3 or 4 is turned through an angle, the encoder 25 outputs pulses representing the angle. In response to the pulses, the microcomputer 22b automatically detects the operation of the shifting mechanism 2 and, consequently, reads the scale image 14 from the memory 24 and sends the read image through the drive circuit 21 to the display elements 7 of the optical unit 100, which displays the scale image 14 on the screen 10. If the shifting mechanism 2 is not operated for five or more seconds, the microcomputer 22b automatically stops display of the scale image 14. The encoder 25 and microcomputer 22b constitute the shifting mechanism operation detector for detecting the operation of the shifting mechanism 2.

Figure 9:
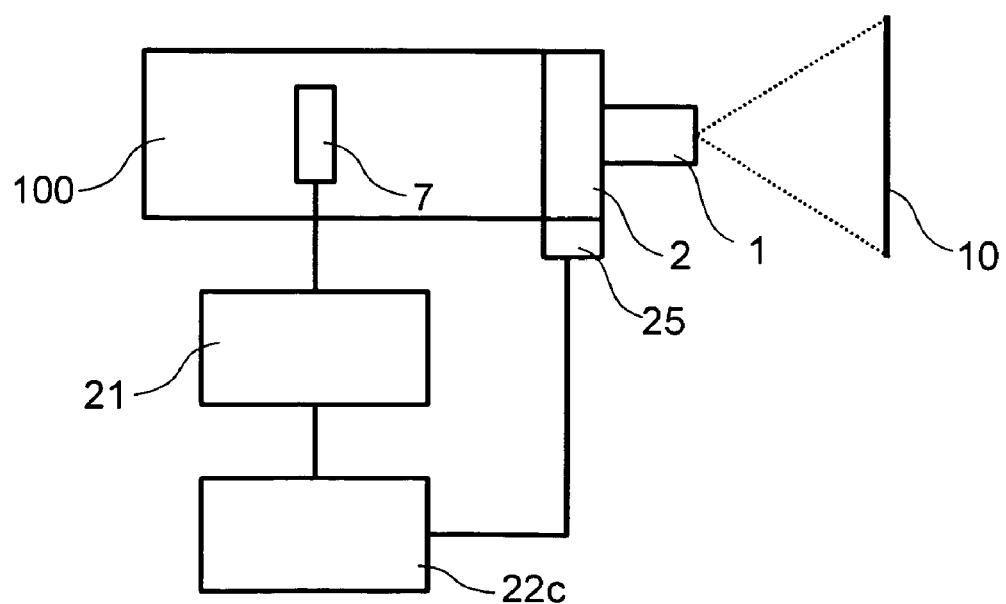
FIG. 9 is a block diagram of a projection display device according to a further embodiment of the present invention.

FIG. 9 shows a projection display device according to another embodiment of the present invention. This projection display device includes a display drive circuit 21 and a microcomputer 22c. The shifting mechanism 2 of this display device includes an encoder 25. For example, if the shift dial 3 or 4 is turned through an angle, the encoder 25 outputs pulses representing the angle. From the pulses, the microcomputer 22c calculates the vertical and lateral positions of the shifting mechanism 2. In proportion to deviations from the central position of the shifting mechanism 2, the microcomputer 22c calculates the deviations of the optical axis of the projection lens 1 from the position of this axis in the central position of the shifting mechanism. According to the calculated deviations, the microcomputer 22c displays the position 11 of the optical axis of the projection lens 1 in the form of cross hairs through the drive circuit 21 in the corresponding position on the projection screens of the display elements 7. Before the projection lens 1 is shifted (with the shifting mechanism 2 in the central position), the cross hairs indicating the position of the optical axis of the projection lens 1 are positioned in the center of the range of video light projection on the screen 10. As the shifting mechanism 2 shifts the projection lens 1, the cross hairs are shifted in the image projected onto the screen 10. The optical axis position 11 displayed on the screen 10 is the point that should be positioned on the optical axis of the projection lens 1 when the projection display is installed. By so installing the projection display that the projection lens 1 is positioned just in front of the displayed axis position 11, it is possible to more easily carry out correct positioning of the display without trapezoidal distortion. The encoder 25 and microcomputer 22c constitute a shifting mechanism position detector for detecting the position of the shifting mechanism 2.

Figure 5:
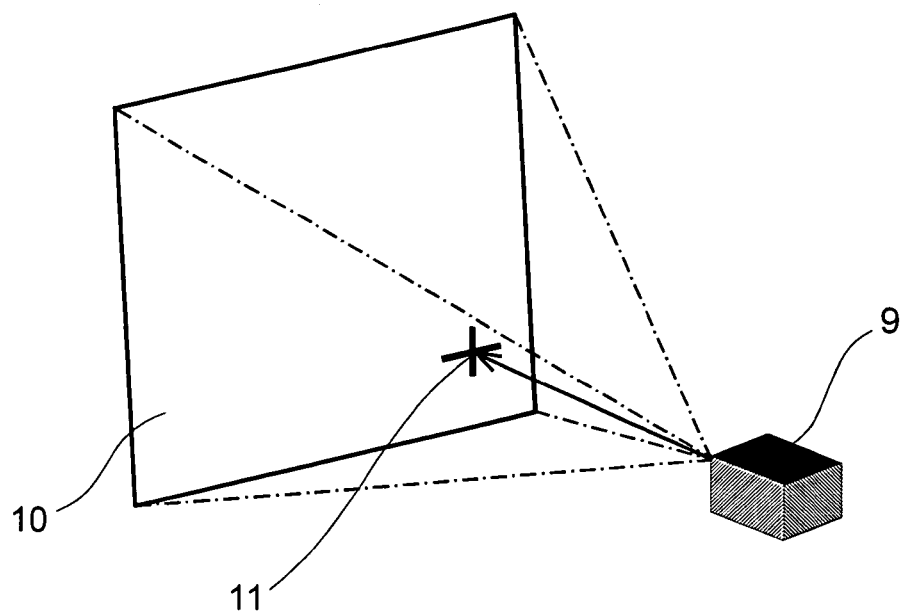
FIG. 5 is a diagram which shows the positional relationship among the projection display, the screen and the optical axis displayed on the screen by the projection display.

FIG. 5 shows the relationship among the position of the projection display as installed practically, the screen 10 and the position 11 of the optical axis displayed on the screen. The axis position 11 is deviated from the center of the projected image within this image in proportion to the distances by which the shifting mechanism 2 is shifted the projection lens 1. By so positioning the projection display as to finally force it to be installed just in front of the axis position 11, as shown in FIG. 5, it is possible to install the display correctly without causing trapezoidal distortion. If the axis position 11 were not displayed in the projected image, it would be difficult to see in what direction the installed display has deviated.

A projection display device according to still another embodiment of the present invention includes no mechanism for shifting its projection lens, but it can display the position of the optical axis of the lens on a screen when necessary. By installing this projection display device just in front of the axis position displayed on the screen, it is possible to easily find the point where the display should be set relative to the screen.

Figure 6:
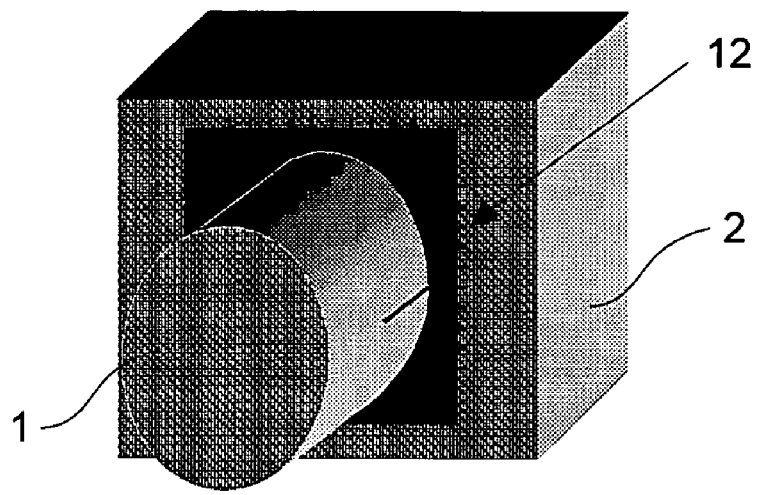
FIG. 6 is a perspective view of a projection display device according to another embodiment of the present invention.

FIG. 6 shows a projection display device according to a further embodiment of the present invention. The main body and projection lens 1 of this projection display device have scales 12 for the shifting mechanism 2. In this case, even if the shift dials of the shifting mechanism 2 can be turned through more than 360 degrees, the values read from the scales can correspond in one-to-one relation to the deviations of a projected image. This is also effective for a projection display device including a free-stop projection lens 1, a mechanism for shifting the lens and no shift dials. Of course, as is the case with the first embodiment, the scale marks for vertical and lateral shifts correspond in one-to-one relation to the vertical and lateral unit distances, respectively, in the range of video light projection on a screen.

As stated above, the predetermined unit distances in the range of video light projection on the screen correspond in one-to-one relation to the scale marks of the shifting mechanism 2. The scale marks represent the distances by which the projection lens 1 is shifted. The one-to-one correspondence makes it easy to install the projection display in a suitable position where the display can project an image to a desired position on the screen without causing trapezoidal distortion.

As described hereinbefore, the present invention makes it possible to provide a projection display device that offers improved convenience.

What is claimed is:

1. A projection display device comprising:
    a lighting unit;
    a display element which modulates the intensity of a light flux from the lighting unit to form an optical image; and
    a projecting optical system which projects an image;
    the projecting optical system including an adjusting dial with a scale representing the position of the projecting optical system relative to the display element.

2. The projection display device as defined in claim 1, wherein the scale has marks so spaced as to represent a distance corresponding to the size of a projected image.

3. The projection display device as defined in claim 2, wherein the adjusting dial includes a clicking mechanism for indicating an adjusting central position.

4. The projection display device as defined in claim 2, wherein the adjusting dial has a maximum turning angle of 360 degrees or less.

5. The projection display device as defined in claim 1, wherein the adjusting dial includes a clicking mechanism for indicating an adjusting central position.

6. The projection display device as defined in claim 1, wherein the adjusting having dial has a maximum turning angle of 360 degrees or less.

7. The projection display device as defined in claim 1, wherein the adjusting dial enables a shifting of the displayed position of an optical axis of a projection lens of the projecting optical system in accordance with a position of the adjusting dial.

8. A projection display device comprising:
    a lighting unit;
    a display element which modulates the intensity of a light flux from the lighting unit to form an optical image;
    a projecting optical system which projects an image;
    the projecting optical system including an adjusting dial with a scale representing the position of the optical system relative to the display element; and
    a driving circuit which drives the display element so as to superpose on the optical image a lattice image corresponding to the scale.

9. The projection display device as defined in claim 8, wherein the driving circuit drives the display element so as to superpose the lattice image on the optical image when a projection angle is adjusted using the adjusting dial.

10. The projection display device as defined in claim 9, wherein the adjusting dial includes a clicking mechanism for indicating an adjusting central position.

11. The projection display device as defined in claim 9, wherein the adjusting dial has a maximum turning angle of 360 degrees or less.

12. The projection display device as defined in claim 8, wherein the adjusting dial includes a clicking mechanism for indicating an adjusting central position.

13. The projection display device as defined in claim 8, wherein the adjusting dial has a maximum turning angle of 360 degrees or less.

14. The projection display device as defined in claim 8, wherein the adjusting dial enables a shifting of the displayed position of an optical axis of a projection lens of the projecting optical system in accordance with a position of the adjusting dial.

15. A projection display device comprising:
    a lighting unit;
    a display element which modulates the intensity of a light flux from the lighting unit to form an optical image;
    a projecting optical system which projects an image;
    the protecting optical system including an adjusting dial with a scale representing the position of the optical system relative to the display element:
    a displaying unit which displays the position of the optical axis of the optical system on the projected image; and
    wherein the adjusting dial can shift the displayed position of the optical axis.

16. The projection display device as defined in claim 15, wherein the adjusting dial includes a clicking mechanism for indicating an adjusting central position.

17. The projection display device as defined in claim 16, wherein the adjusting dial has a maximum turning angle of 360 degrees or less.

18. The projection display device as defined in claim 15, wherein the adjusting dial has a maximum turning angle of 360 degrees or less.

19. The projection display device as defined in claim 15, wherein the adjusting dial enables a shifting of the displayed position of an optical axis of a projection lens of the projecting optical system in accordance with a position of the adjusting dial.

* * * * *